Dec. 25, 1951   G. A. LYON   2,579,505
WHEEL STRUCTURE
Filed Dec. 20, 1946   2 SHEETS—SHEET 1
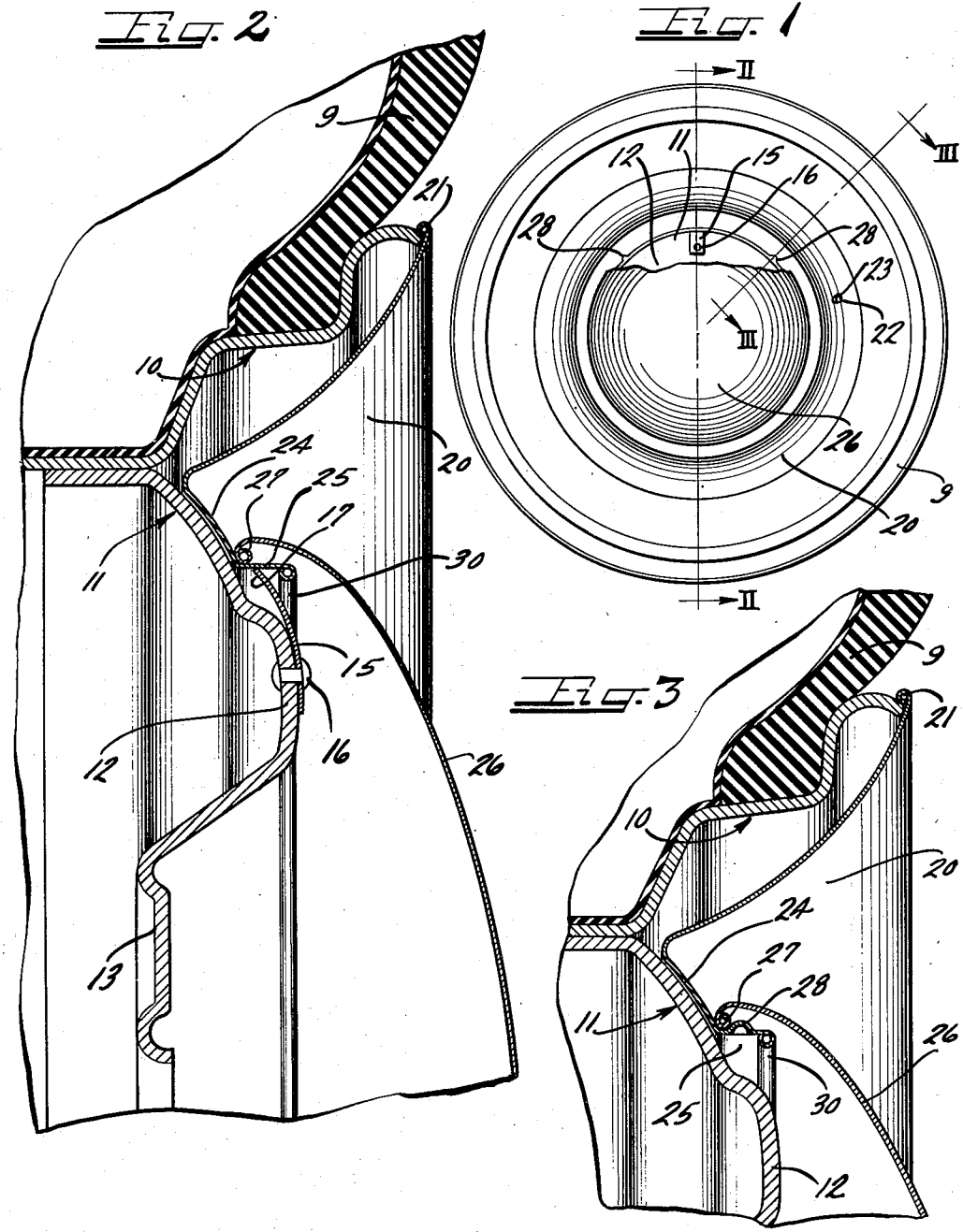
Inventor
GEORGE ALBERT LYON Dec. 25, 1951  G. A. LYON  2,579,505
WHEEL STRUCTURE
Filed Dec. 20, 1946  2 SHEETS—SHEET 2
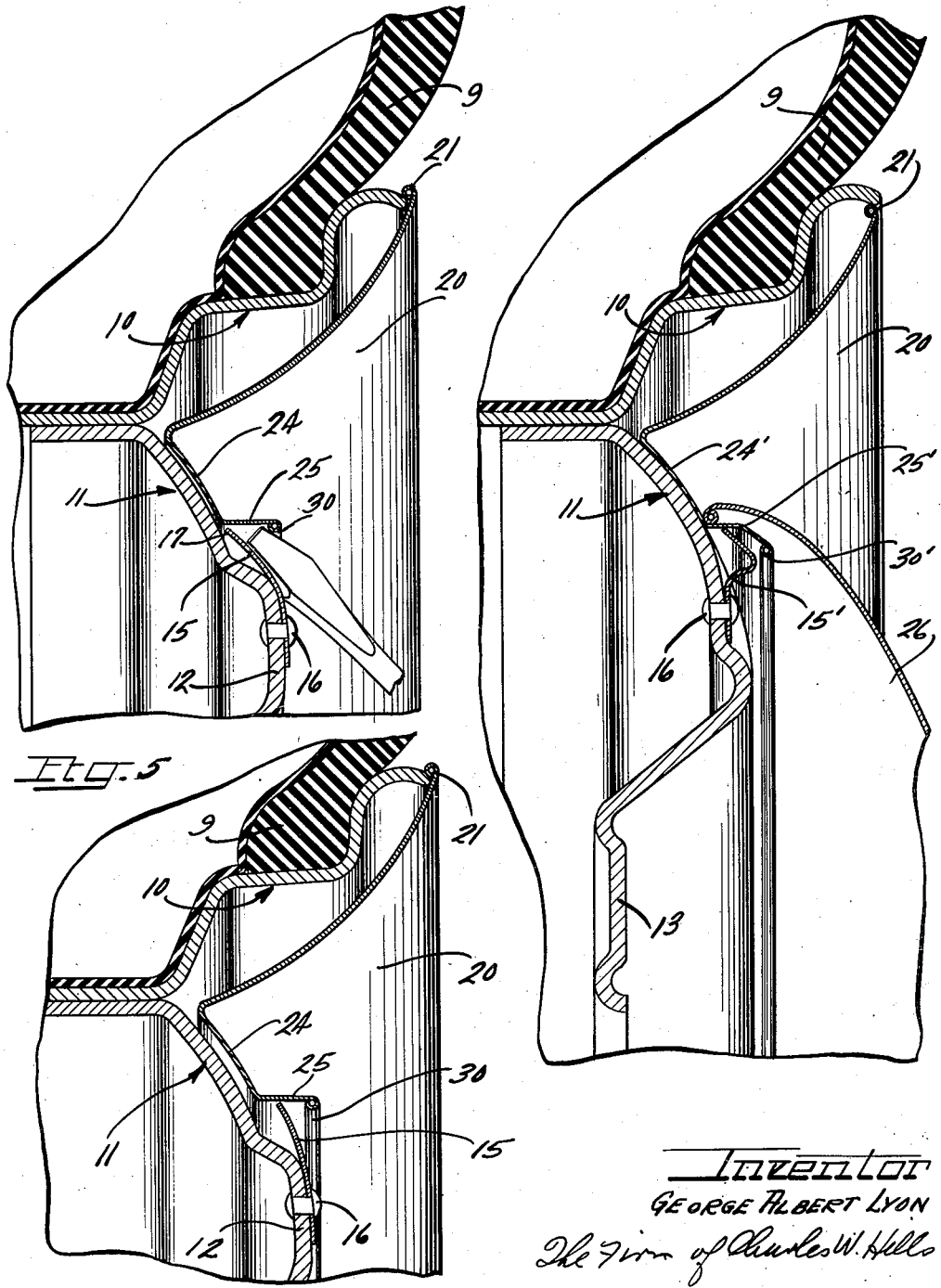
Inventor
GEORGE ALBERT LYON
The Firm of Charles W. Hills
by Attys.

Patented Dec. 25, 1951

2,579,505

UNITED STATES PATENT OFFICE 2,579,505

WHEEL STRUCTURE

George Albert Lyon, Allenhurst, N. J.

Application December 20, 1946, Serial No. 717,352

7 Claims. (Cl. 301—37)

This invention relates to an automobile wheel structure, and more particularly to a wheel cover with simplified and novel retaining means for detachably holding the cover on the wheel.

An object of this invention is to provide in a wheel cover assembly a trim ring and a central hub cap detachably supported on the center of the ring, the ring being provided with concealed retaining means accessible through the center of the ring after removal of the hub cap for detaching the ring from the wheel.

Another object of this invention is to provide in an automobile wheel structure of the type including a tire trim and a wheel body, retaining means centrally carried on the wheel body and a trim ring cooperable therewith and having a central opening through which access may be had to the retaining means for releasing the trim ring from retaining engagement thereby.

Another object of the invention relates to the provision in an automobile wheel structure of a combination trim ring and hub cap assembly, together with retaining means on the wheel body so interrelated with the assembly that the trim ring may be initially engaged thereby and may be pushed home into a finally held position by the action of snapping a hub cap into detachable engagement with the inner margin of the trim ring.

In accordance with the general features of this invention there is provided in a wheel structure, including a multi-flange tire rim and a wheel body having ring retaining means thereon, a cover assembly including an annular trim ring for disposition opposite the flanges of the rim and having an inner margin formed to be detachably pressed into engagement with the retaining means and carrying hub cap retaining means, a hub cap detachably engaged by the hub cap retaining means and removable to afford access to the cover retaining means; the cover retaining means being accessible upon removal of the hub cap for manual engagement to release the trim ring for removal.

Another feature of the invention relates to the cover retaining means in the foregoing assembly comprising a plurality of radially outwardly extending fingers, each having an inner portion fastened to the wheel body and having an outer portion for biting engagement with a shoulder-like inner margin on the trim ring, the free portion of the finger being deflectable rearwardly to enable disengagement from the trim ring.

Still another feature of the invention relates to the forming of the cover retaining fingers so that any tendency of the cover or ring becoming accidentally dislodged enhances the biting engagement of the fingers on the cover.

Yet another feature of the invention relates to the forming of the hub cap retaining means on the inner ring margin in the form of a plurality of spaced bumps over which the outer edge of the hub cap is adapted to be resiliently cammed.

Other objects, features and advantages of the present invention will be fully apparent from the following detailed description of several embodiments thereof, taken in conjunction with the accompanying drawings, in which:

Figure 1 is a side view of a tire wheel and cover assembly embodying my invention and showing a portion of the hub cap broken away to illustrate the trim ring and hub cap retaining means;

Figure 2 is an enlarged fragmentary cross-sectional view taken on substantially the line II—II of Figure 1 looking in the direction indicated by the arrows and showing one of the ring retaining fingers in biting engagement with a shouldered margin on the trim ring;

Figure 3 is a fragmentary cross sectional view similar to Figure 2 but taken on the line III—III of Figure 1 looking in the direction indicated by the arrows and showing one of the hub cap retaining bumps on a cover ring in cooperation with the turned outer edge of the hub cap;

Figure 4 is a fragmentary cross sectional view similar to Figure 2 with the hub cap removed, and illustrating how a screw driver may be used to depress one of the cover ring retaining fingers out of retaining engagement with the ring;

Figure 5 is a fragmentary sectional view similar to Figure 4, showing the cover ring in the process of being pressed over a retaining finger and in a position just prior to the ring being pressed finally home; and Figure 6 is an enlarged fragmentary sectional view similar to Figure 2, showing a slightly modified form of cover retaining finger.

As shown on the drawings:

The reference character 9 designates generally a conventional automobile pneumatic tire and tube assembly carried in the usual way upon a multiflange drop center type of tire rim 10. This tire rim 10 comprises one part of the automobile wheel and is of a conventional construction. The other part of the wheel comprises a wheel body or spider designated generally by the reference character 11, and which is made of a metallic stamping. This body part 11 includes a bulged central nose portion 12 and the usual bolt-on flange 13 by means of which the wheel is fastened in the usual way to a part on an automobile axle.

The bulged central nose portion 12 of the wheel body carries a plurality of circumferentially spaced cover or trim ring retaining spring fingers 15. Each of these fingers extends generally radially outwardly and has its inner end fastened, as by means of a rivet 16, to the wheel body portion 12. The outer free portion 17 of each finger is inclined axially rearwardly and is adapted to have biting engagement with a portion of the cover or trim ring 20, to be hereinafter described in detail. The fingers 15 may be of any suitable number, such, for example, as 4 or 5, and are so disposed as to be readily accessible upon removal of the central hub cap 26, to be described hereinafter.

Cooperable with the retaining fingers 15 is an annular trim ring 20 having an outer turned edge 21 adapted to overhang an outer edge of the tire rim 10. This trim ring 20, as shown in Figure 1, may have a hole 22 through which the end of the usual valve stem 23 of the tire assembly may project so as to be accessible. It will be perceived from Figure 2 that the trim ring 20 extends radially and axially inwardly from the turned edge 21 toward the wheel body 11 where it is turned into a curved portion 24. The main portion of the trim ring 20 is of such curvature that when it is on a wheel it appears to constitute a continuation of the curved outer side wall of the tire. In this manner the trim ring 20 not only covers the unsightly exposed stepped flanges of the tire rim 10, but, in addition, enables a highly ornamental effect. If the main portion of the trim ring between the edge 21 and the portion 24 is painted white, it will, in use, appear to comprise a white side wall portion of the tire, thus giving the illusion of the wheel having a white side wall tire in which the tire extends clear down to the body part 11. This particular feature is already covered in my previous Letters Patent.

The portion 24 of the trim ring 20 is adapted, when the trim ring is pushed home into retained position on the wheel, to bottom against the body part 11. The inner margin of the portion 24 and of the trim ring 20 is formed into an axially extending shoulder 25, which is of such a diameter as to be cooperable with the outer extremities of the cover or trim ring retaining fingers 15. In this manner the cover or trim ring is reinforced at its point of engagement by the retaining means. As a consequence, I am enabled to make the trim ring 20 of a very thin sheet material, such, for example, as thin sheet steel or the like.

In addition, the shoulder 25 is provided with a plurality of spaced radially outwardly extending protuberances 28, which may be of any suitable number, such for example, as 3 to 5. These protuberances are so arranged that they can retainingly cooperate with the outer turned edge 27 of a central hub cap 26. The hub cap 26 is of the usual crown type and has a flexible turned outer edge 27 adapted to be cammed over and behind retaining bumps 28, as shown in Figure 3. The hub cap is easily removed by inserting the end of a screw driver behind the turned edge 27 and forcibly prying it off of the bumps 28.

Once the hub cap 26 has been removed, access may be had not only to the central bolted-on flange 13, but also to the fingers 15. As shown in Figure 4, each finger 15 may be depressed axially rearwardly by a suitable pry off tool, such, for example, as a screw driver whereby the finger can be disengaged from its biting engagement with the shouldered inner margin 25 of the trim ring 20. The progressive releasing of these fingers 15 enables the trim ring to be thereafter displaced from the wheel.

In Figure 5 I have illustrated the trim ring in the process of being applied to the wheel and over the fingers 15. It will be noted that when the outer edge 21 of the trim ring engages the tire rim 10, the inner portion 24 of the trim ring is slightly spaced from the body part 11 of the wheel and the fingers 15 are not in their final engaged position with the shoulder 25.

Thereafter in the act of pushing the hub cap 26 home into retained engagement with the bumps 28, the inner portion 24 of the trim ring is flexed toward the wheel body thus forcing the fingers 15 into tight biting engagement with the inner shouldered margin 25 of the trim ring.

If it is so desired the edge of the shouldered margin 25 of the trim ring 20 may be curled or rolled as at 30 to reinforce the same. This is advantageous where thin metal is used, especially since this shoulder 25 constitutes the retaining connection between the hub cap and the wheel through the fingers 15.

In Figure 6 I have illustrated a slight modification of the invention wherein I employ the same reference numerals to designate the parts or portions that are common to both Figures 2 and 6.

It will be noted that the principal difference resides in the fact that the inner shoulder 25' on portion 24' of the cover is bent slightly radially inwardly before terminating in the rolled edge 30'. In addition, the fingers 15' are of a slightly different construction. These fingers 15' are each of the hump or goose-neck type. With the exception of these differences, this form of the invention is the same and operates in the same manner as in the previous form.

In both forms of the invention, due to the inclination of the free extremities of the fingers toward the medial plane of the wheel, any tendency for the trim ring to become accidentally dislodged results in an enhancement of the biting engagement of the fingers with the shouldered inner margin of the trim ring. In other words, the axially outward movement of the trim ring tends to straighten the fingers thus causing them to bite tighter into the shouldered margin of the ring. As a consequence, the only way in which this biting engagement can be broken is to press the fingers rearwardly and release them so that the trim ring or cover may thereafter be removed.

I claim as my invention:

1. In a wheel structure including a multi-flange tire rim and a wheel body having cover retaining means thereon, a cover assembly including an annular trim ring for disposition opposite the flanges of the rim and having an inner margin formed to be detachably pressed into engagement with said retaining means and carrying hub cap retaining means, and a hub cap detachably snapped over said hub cap retaining means and removable to afford access to said cover retaining means, said cover retaining means being accessible upon removal of said hub cap for manual engagement to release the same from holding engagement with said ring margin, said cover retaining means comprising a plurality of generally radially extending fingers each having a free extremity with a biting edge directed generally axially rearwardly and arranged for biting engagement with said ring inner margin.

2. In a wheel structure including a multi-flange tire rim and a wheel body having cover retaining means thereon, a cover assembly including an annular trim ring for disposition opposite the flanges of the rim and having an inner margin formed to be detachably pressed into engagement with said retaining means and carrying hub cap retaining means, and a hub cap detachably snapped over said hub cap retaining means and removable to afford access to said cover retaining means, said cover retaining means being accessible upon removal of said hub cap for manual engagement to release the same from holding engagement with said ring margin, said ring inner margin comprising a generally axially extending flange and said cover retaining means comprising spaced fingers inside of said flange and behind the hub cap, each having a biting edge extremity directed generally toward and deflectable upon pressing of the trim ring into assembly into biting engagement with said flange.

3. In a wheel structure including a multi-flange tire rim and a wheel body having cover retaining means thereon, a cover assembly including an annular trim ring for disposition opposite the flanges of the rim and having an inner margin formed to be detachably pressed into engagement with said retaining means and carrying hub cap retaining means, and a hub cap detachably snapped over said hub cap retaining means and removable to afford access to said cover retaining means, said cover retaining means being accessible upon removal of said hub cap for manual engagement to release the same from holding engagement with said ring margin, said cover retaining means comprising a plurality of fingers each inclined in a direction from the body part axially inward toward the medial plane of the wheel and each of said fingers being deflectable rearwardly upon engagement by the ring inner margin and flexing outwardly into biting engagement therewith.

4. In a wheel structure including a multi-flange tire rim and a wheel body having a central bolt-on flange and an intermediate axially outward nose portion with cover retaining means thereon effective at the radially outer side of the nose portion, a cover assembly including an annular trim ring for disposition opposite the flanges of the rim and having an inner margin formed to be detachably pressed into engagement with said retaining means and carrying hub cap retaining means, and a hub cap detachably snapped over said hub cap retaining means and removable to afford access to said cover retaining means, said cover retaining means being accessible upon removal of said hub cap for manual engagement to release the same from holding engagement with said ring margin, said ring comprising dished concentric diverging annular portions, the inner of which terminates in said inner margin and the junction of said portions being formed to bear on the body part adjacent the tire rim of the wheel.

5. In a wheel structure including a multi-flange tire rim and a wheel body having cover retaining means thereon, a cover assembly including an annular trim ring for disposition opposite the flanges of the rim and having an inner margin formed to be detachably pressed into engagement with said retaining means and carrying hub cap retaining means, and a hub cap detachably snapped over said hub cap retaining means and removable to afford access to said cover retaining means, said cover retaining means being accessible upon removal of said hub cap for manual engagement to release the same from holding engagement with said ring margin, said cover retaining means comprising a plurality of circumferentially spaced springs, each generally extending radially outwardly from a point of attachment to the body part and each having a goose-neck flexible extremity for biting engagement with a radially inner surface of the inner margin of the ring.

6. In combination in a wheel structure of the character described, a tire rim, a load sustaining disc type wheel body having a generally axially outwardly protruding annular nose bulge, a series of individual cover retaining generally radially outwardly and axially inwardly projecting resiliently flexible biting finger elements secured to said nose bulge and each having a biting edge on its free extremity, and a trim ring member having a radially inner generally axially outwardly extending annular flange retainingly engaged by said biting fingers and terminating in a bead axially spaced from the adjacent portions of the spring fingers.

7. In a wheel structure including a tire rim and a wheel body, a trim ring member having a portion disposed opposite the tire rim and a portion disposed opposite the wheel body and including a generally axially outwardly extending flange, retaining means carried by the wheel body comprising a series of radially extending flexible biting fingers having biting tips disposed to be flexed in assembly in a generally axially inward direction and engaging bitingly with said flange, said biting fingers being located with respect to said flange to be accessible for engagement with a pry-off tool to deflect the biting fingers out of the biting engagement with said flange, said flange having means thereon axially outwardly from that portion thereof engaged by the biting fingers and affording a shoulder against which a pry-off tool can be fulcrumed in prying the biting fingers out of engagement with said flange.

GEORGE ALBERT LYON.

REFERENCES CITED

The following references are of record in the file of this patent:

UNITED STATES PATENTS

| Number | Name | Date |
|---|---|---|
| 2,020,885 | Gatta | Nov. 12, 1935 |
| 2,162,730 | Lyon | June 20, 1939 |
| 2,166,216 | Lyon | July 18, 1939 |
| 2,183,220 | Horn | Dec. 12, 1939 |
| 2,293,007 | Lyon | Aug. 11, 1942 |
| 2,326,788 | Lyon | Aug. 17, 1943 |
| 2,368,253 | Lyon | Jan. 30, 1945 |